R. A. & H. D. BOWSER.
NUT LOCK.
APPLICATION FILED OCT. 24, 1912. RENEWED DEC. 2, 1913.
1,083,725.
Patented Jan. 6, 1914.
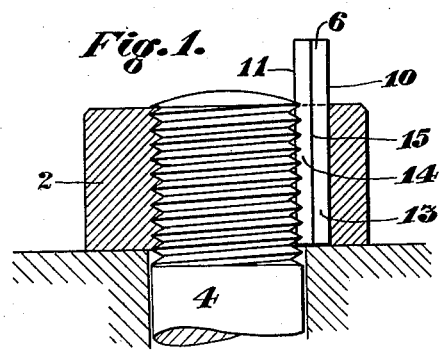
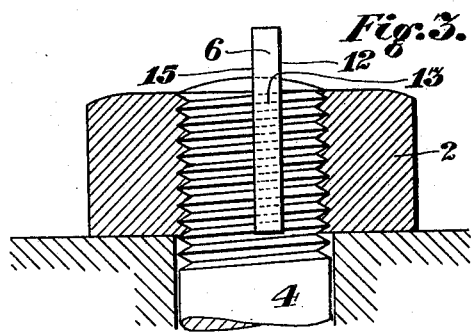
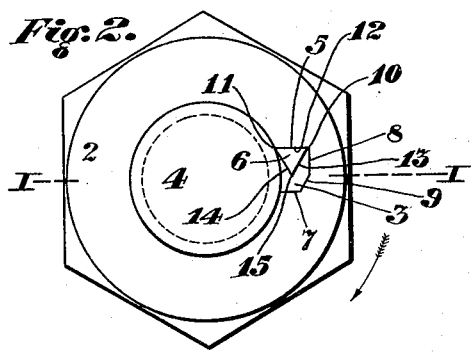
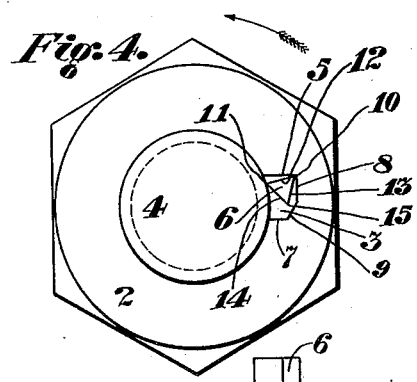
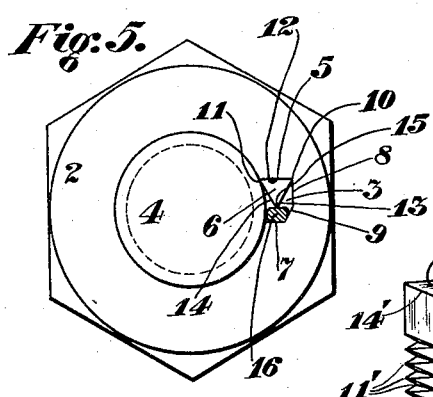
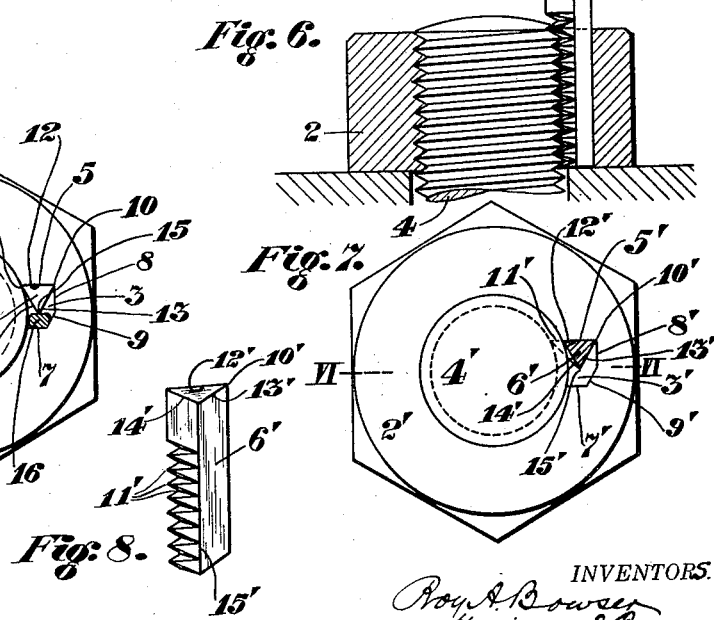
WITNESSES:
INVENTORS.
Roy A. Bowser
BY Hamilton D. Bowser
C. M. Clarke ATTORNEY.

UNITED STATES PATENT OFFICE.

ROY A. BOWSER AND HAMILTON D. BOWSER, OF NEW KENSINGTON, PENNSYLVANIA.

NUT-LOCK.

1,083,725.               Specification of Letters Patent.              Patented Jan. 6, 1914.

Application filed October 24, 1912, Serial No. 727,545.    Renewed December 2, 1913.    Serial No. 804,295.

*To all whom it may concern:*

Be it known that we, ROY A. BOWSER and HAMILTON D. BOWSER, citizens of the United States, residing at New Kensington, in the county of Westmoreland and State of Pennsylvania, have invented certain new and useful Improvements in Nut-Locks, of which the following is a specification.

Our invention consists of an improvement in nut locks and has for its object to provide a nut having an inserted key so designed and mounted within a specially formed and designed cavity within the nut to operate to rotate with the nut free of engagement with the threads in the operation of screwing the nut upon the bolt, but to immediately bite into the threads of the bolt with increasing force upon reverse movement of the nut, whereby to positively make an interlocking binding engagement against removal.

Preferred forms of the construction are illustrated in the accompanying drawings, in which—

Figure 1 is a sectional view showing the threaded portions of the bolt and a nut thereon provided with our improvement, indicated by the line I. I. of Fig. 2. Fig. 2 is a plan view of the construction shown in Fig. 1. Fig. 3 is a sectional view similar to Fig. 1, at right angles thereto, showing the locking key in elevation and in operative position with relation to the threads of the bolt. Fig. 4 is a plan view similar to Fig. 2, illustrating the action of the device in unscrewing. Fig. 5 is a similar plan view illustrating the use of a supplemental locking key or wedge for the purpose of holding the main locking key out of binding engagement with the threads. Fig. 6 is a sectional view similar to Fig. 1 showing the use of a modified construction of locking key, having a serrated or threaded edge. Fig. 7 is a plan view of the construction shown in Fig. 6. Fig. 8 is a perspective detail view of such modified form of locking pin.

The device is intended to be used in connection with an ordinary nut, either square or hexagonal, cut out as hereinafter described, and with an ordinary bolt. As shown, the nut 2 is provided with a longitudinal cavity 3 cut through the depth of the nut from one side to the other at one side of the ordinary threaded bolt opening for the bolt 4. The cavity 3 is entirely open for the full depth of the nut from top to bottom and for the full width of the opening, as shown. It is made flat at one side, as indicated at 5, for the purpose of providing a bearing for the inner face of the locking key 6 when in inoperative position. Said face 5 is so arranged to lie in a line or plane somewhat off-set from the axial center of the bolt to facilitate the operation of the locking key in the manner hereinafter described. The other or opposite side or wall 7 of the opening 3 may be made parallel with the side 5, while the intervening connecting walls are preferably made in the manner indicated at 8 and 9, the wall 8 being substantially at right angles to the wall 5 and extending therefrom to about the center line of the nut, the wall 9 being sloped or curved somewhat inwardly toward the center of the nut, as shown.

The key 6 is equilaterally triangular in cross section having a fulcrum edge 10 and a biting edge 11 at each termination of the flat face 12 which is adapted to confront and bear against the surface 5 in screwing on the bolt, the other faces 13 and 14 converging toward the intervening edge 15, as shown.

It will be understood that the locking key is preferably made of hardened steel and is adapted to fit snugly within the receiving space, with very slight or no clearance of the bolt threads, whereby to permit of the screwing on of the bolt without engagement. Upon reversal of the nut, however, the edge 11 immediately bites into the outer edges of the bolt threads, the key 6 then assuming the position indicated in Fig. 4 and turning on its fulcrum edge 10 inwardly toward the center of the bolt and binding tightly and biting into the threads thereof, thereby positively preventing the further unscrewing of the nut.

An advantage in making the key 6 triangular and equilateral as shown, is that it thus provides a plurality of equally spaced edges and may be changed in position when one of the edges becomes worn.

If desired, means can be provided for positively holding the key 6 out of engagement with the threads of the bolt, as by inserting a wedge 16 between the edge 15 of the key and the wall 7 of the cavity 3, as shown in Fig. 5. Any suitable device as a horse-shoe nail may be used for such purpose, and the biting edge 11 will thus be positively held out of engagement with the threads, permitting unscrewing and removal of the nut.

If desired, the biting edge of the key may be serrated to interfit with the threads, thereby insuring greater surface contact and engagement, as indicated at 11' (Figs. 6, 7 and 8).

The key 6' is otherwise of the same general construction and manner of operation already described, mounted in a similar cavity 3', as clearly shown.

The advantages of the invention will be readily appreciated by all those familiar with this class of devices.

It is extremely simple, cheap in construction, very efficient and positive in operation, and possesses advantages over other forms of wedging or rolling locking devices intended for the same purpose.

Having described our invention, what we claim and desire to secure by Letters Patent is:

In a nut lock, the combination of a nut having an inner open-sided longitudinal channel extending through the nut bounded at one side by a bearing face or plane and forming with another face a fulcrum bearing corner, and a locking key of equilateral triangular shape in cross section having flat faces and sharp terminal edges, one of said edges bearing in said corner, the adjacent edge being adapted to engage the threads of a co-acting bolt, the intervening flat face being adapted to bear upon the bearing face of the nut channel, substantially as set forth.

In testimony whereof we hereunto affix or signatures in the presence of two witnesses.

ROY A. BOWSER.
HAMILTON D. BOWSER.

Witnesses:
C. M. CLARKE,
FREDK. STAUB.

---

Copies of this patent may be obtained for five cents each, by addressing the "Commissioner of Patents, Washington, D. C."